(12) United States Patent
Igarashi et al.

(10) Patent No.: US 6,351,504 B1
(45) Date of Patent: Feb. 26, 2002

(54) RECEPTION CIRCUIT

(75) Inventors: Sadao Igarashi; Syuichi Tsuda, both of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/211,116

(22) Filed: Dec. 14, 1998

(30) Foreign Application Priority Data

Dec. 26, 1997 (JP) .............................. 9-360397

(51) Int. Cl.[7] .............................. H04B 1/10
(52) U.S. Cl. .................................... 375/349
(58) Field of Search .............................. 375/349, 334, 375/326, 345, 316, 130, 147, 148; 370/328, 329, 342; 455/226.1, 226.2, 226.3, 222

(56) References Cited

U.S. PATENT DOCUMENTS

| 5,603,097 A | * | 2/1997 | Kanou | 455/76 |
| 6,028,850 A | * | 2/2000 | Kang | 370/320 |
| 6,038,268 A | * | 3/2000 | Kawai | 375/334 |

FOREIGN PATENT DOCUMENTS

| JP | Hei 7-297752 | 11/1995 |
| JP | Hei 9-321691 | 12/1997 |

* cited by examiner

Primary Examiner—Chi Pham
Assistant Examiner—Khai Tran
(74) Attorney, Agent, or Firm—Brinks Hofer Gilson & Lione

(57) ABSTRACT

A reception signal has a performance in which a disturbance signal level exceeds a reference line in IS-95 and in which a C/N of the whole of a reception signal level is satisfactory. A reception circuit comprises an RF amplifier for amplifying a variable gain of a reception signal, a bypass circuit connected in parallel to the RF amplifier and a control switching unit for switching a gain state of the RF amplifier and a connected state of the bypass circuit in response to a reception signal level, wherein the control switching unit sets a first operation state in which the RF amplifier is placed in an automatic gain amplified state and the bypass circuit is placed in a non-connected state when the reception signal level falls within the smallest range and increases with the lapse of time, the control switching unit sets a second operation state in which the RF amplifier is placed in a non-operable state and the bypass circuit is placed in a connected state when the reception signal level goes from the first range to a second range larger than the first range, and the control switching unit switches the RF amplifier and the bypass circuit from the second operation state to the first operation state when the reception signal level decreases with the lapse of time and reaches an intermediate level from the second range to the first range.

8 Claims, 7 Drawing Sheets

RECEPTION CIRCUIT

BACKGROUND OF THE INVENTION

1. Field of the Invention

The present invention relates to a reception circuit, and particularly to a reception circuit for use with a code-division-multiple-access (hereinafter referred to as a CDMA) system portable telephone and in which a high-frequency amplifying unit and an intermediate-frequency amplifying unit amplify a variable gain of a reception signal such that a reception signal level satisfies a predetermined standard.

2. Description of the Prior Art

Recently, as portable telephones are rapidly widespread, the number of communication channels is becoming short. Therefore, it is considered that a frequency modulation (FM)-system portable telephone is moved to a CDMA-system portable telephone in which many channel numbers can be maintained. In the U.S.A, as the FM-system (AMPS system in U.S.A) portable telephone is moved to the CDMA-system portable telephone, a CDMA/AMPS dual mode-system portable telephone in which the AMPS system portable telephone and the CDMA-system portable telephone coexist within the same signal bands is proposed and about to be put in practical use.

In this case, the FM-system portable telephone has not only a narrow range in which power of a transmission signal can be controlled upon signal transmission, but unsatisfactory accuracy of transmission frequencies. In the CDMA-system portable telephone, when a reception signal level exceeds a constant level due to the influence of a large disturbance signal, there occurs a call drop (call drop). Therefore, in the CDMA/AMPS dual mode system portable telephone, it is necessary to protect the CDMA system from being largely affected by mutual modulation disturbance of the AMPS system. Accordingly, in the U.S.A, the IS-95 is specified as a performance standard for mutual modulation disturbance in the CDMA system. According to the IS-95, there are standardized disturbance signal levels in which the reception signal level is −101 dBm, −90 dBm and −79 dBm.

The portable telephone of the known CDMA/AMPS dual mode system adopts a means (hereinafter referred to as a first means) using an automatic gain amplifier in a high-frequency state of a reception circuit to adjust the automatic gain amplifier in response to a reception signal level and a means (hereinafter referred to as second means) using a low-noise high-frequency amplifier in the high-frequency stage of the reception circuit and a reception signal bypass circuit for selectively bypassing the low-noise high-frequency amplifier to place the reception signal bypass circuit in a connected state or in a non-connected state in response to the reception signal level.

FIG. 4 is a block diagram showing an example of a known CDMA/AMPS dual mode system portable telephone, and mainly shows a reception circuit unit in which the aforementioned first means is adopted in the high-frequency stage of the reception circuit.

As shown in FIG. 4, the CDMA/AMPS dual mode system portable telephone comprises: a reception circuit unit composed of an attenuator 31, an automatic gain high-frequency amplifier 32, a bandpass filter 33, a frequency converter 34, a CDMA filter 35, an AMPS filter 36, a change-over switch 37, an intermediate-frequency amplifier 38, a QPSK demodulator 39 and a control voltage generating unit 40; a transmission circuit unit composed of a transmission signal forming circuit 41; and a transmission and reception common circuit unit composed of a duplexer 42, a transmission and reception unit 43, a local oscillator 44 and a control unit 45.

Then, in the reception circuit unit, the attenuator 31 has an input terminal connected to an output terminal of the duplexer 34 and an output terminal connected to an input terminal of the automatic gain high-frequency amplifier 32. The automatic gain high-frequency amplifier 32 has an output terminal connected to an input terminal of the bandspass filter 33. The bandpass filter 33 has an output terminal connected to a first input terminal connected to the frequency converter 34. The frequency converter 34 has a second input terminal connected to an output terminal of the local oscillator 43 and an output terminal connected to respective input terminals of the CDMA filter 35 and the AMPS filter 36. The change-over switch 37 has two fixed contacts connected to respective output terminals of the CDMA filter 35 and the AMPS filter 36 and has a movable contact connected to an input terminal of the intermediate-frequency amplifier 38. The intermediate-frequency amplifier 38 has an output terminal connected to an input terminal of the QPSK demodulator 39, and the QPSK demodulator 39 has an output terminal connected to the control unit 45. The control voltage generating unit 40 has an input terminal connected to the control unit 45 and an output terminal connected to a control terminal of the automatic gain high-frequency amplifier 32. In the transmission circuit unit, the transmission signal forming circuit 41 has an input terminal connected to the control unit 45, an output terminal connected to the input terminal of the duplexer 42 and a second input terminal connected to the local oscillator 44. Further, in the transmission and reception common circuit, the duplexer 42 has an input and output terminal connected to the transmission and reception antenna 43.

Also, FIG. 5 is a block diagram showing an example of a known CDMA/AMPS dual mode system portable telephone, and mainly shows the reception circuit unit in which the aforementioned second means is used in the high-frequency stage of the reception circuit.

Having compared the CDMA/AMPS dual mode system portable telephone (hereinafter referred to a second example) according to this example shown in FIG. 5 with the CDMA/AMPS dual mode system portable telephone (hereinafter referred to as a first example) of the preceding example shown in FIG. 4, it is to be noted that the first example differs from the second example only in that, while the first example includes the attenuator 31 and the automatic gain high-frequency amplifier 32 in the reception circuit unit, the second example includes a low-noise high-frequency amplifier 46 and a reception signal bypass circuit 47 selectively connected to the low-noise high-frequency amplifier 46 in parallel, and the first example and the second example are not different from each other in arrangement. Therefore, the circuit arrangement of the second example need not be described more.

Next, FIG. 6 is a characteristic graph showing a C/N (carrier-to-noise ratio) relative to reception signal levels in the first example and the second example of the known CDMA/AMPS dual mode system portable telephone. FIG. 7 is a characteristic graph showing a disturbance signal level relative to reception signal levels in the first example and the second example of the known CDMA/AMPS dual mode system portable telephone.

In FIG. 6, a vertical axis represents a C/N expressed by dB, and a horizontal axis represents a reception signal level expressed by dBm. In FIG. 7, a vertical axis represents a disturbance signal level expressed by dBm, and a horizontal axis represents a reception signal level expressed by dBm.

A characteristic curve L1 in FIGS. 6 and 7 represents a characteristic of the first example, and a characteristic curve L2 represents a characteristic of the second example, a straight line LT in FIG. 6 represents a target line in the C/N, and a straight line LS in FIG. 7 represents a reference line in the IS-95.

An outline of an operation of the first example of the known CDMA/AMPS dual mode system portable telephone is as follows.

A transmission signal formed by the control unit 44 is supplied through the transmission signal forming circuit 41 of the transmission circuit unit to the duplexer 42 and supplied from the duplexer 42 to the transmission and reception antenna 43, and is transmitted from the transmission and reception antenna 43. Also, a reception signal received at the transmission and reception antenna 43 is supplied from the duplexer 42 to the reception circuit unit. In the reception circuit unit, the reception signal is attenuated to a predetermined level by the attenuator 31, amplified by the automatic high-frequency amplifier 32, eliminated in an undesirable signal component by the bandpass filter 33, frequency-mixed with a local oscillation signal from the local oscillator 44 by the frequency converter 34, and a predetermined intermediate-frequency signal is extracted from the resultant frequency-mixed signal by the CDMA filter 35 or the AMPS filter 36 which is changed-over by the change-over switch 37 in response to the kind of the reception signal (CDMA system signal or AMPS system signal). Then, the intermediate-frequency signal is amplified by the intermediate-frequency amplifier 38, demodulated by the QPSK demodulator 39, and a demodulated signal is supplied to the control unit 45. At that time, the control unit 45 generates and supplies intensity data indicating a reception signal level to the control voltage generating unit 40. The control voltage generating unit 40 generates and supplies a gain control voltage corresponding to the supplied intensity data to the automatic gain high-frequency amplifier 32, and changes the gain of the automatic gain high-frequency amplifier 32 in response to the gain control voltage.

In this case, a relationship between the reception signal level and the C/N in the automatic gain high-frequency amplifier 32 corresponding to the change of the gain control voltage is represented by the characteristic curve L1 in FIG. 6, wherein the automatic gain high-frequency amplifier 32 executes the automatic gain control in a range in which the reception signal level is −79 dBm or less.

Also, a relationship between the reception signal level and the disturbance signal level in the automatic gain high-frequency amplifier 32 corresponding to the change of the gain control voltage is represented by the characteristic curve L1 in FIG. 7, wherein the automatic gain high-frequency amplifier 32 executes the automatic gain control in a range in which the reception signal level is −79 dBm or less, similarly.

An operation of the second example of the known CDMA/AMPS dual mode system portable telephone differs from the operation of the first example only in that the reception signal supplied from the duplexer 42 to the reception circuit unit is amplified by the low-noise high-frequency amplifier 46 and supplied to the bandpass filter 33 or bypassed by the reception signal bypass circuit 47 and supplied to the bandpass filter 33 and that the control voltage generating unit 40 generates a driving voltage of the reception signal bypass circuit 47 in response to the intensity data supplied thereto. Other operations thereof are similar to those of the first example. Therefore, the operation of the second example need not be described more.

In this case, a relationship between the reception signal level and the C/N obtained when the reception signal bypass circuit 47 is connected and is not connected in response to the change of the driving voltage is represented by the characteristic curve L2 in FIG. 6, wherein the reception signal bypass circuit 46 is placed in the non-connected state in a range in which the reception signal level is −79 dBm or less and the reception signal bypass circuit 46 is changed to the connected state when the reception signal level exceeds −79 dBm.

Also, a relationship between the reception signal level and the disturbance signal level obtained when the reception signal bypass circuit 47 is connected and is not connected in response to the change of the driving voltage is represented by the characteristic curve L2 in FIG. 7, wherein the reception signal bypass circuit 47 is placed in the non-connected state in a range in which the reception signal level is −79 dBm or less and the reception signal bypass circuit 47 is changed to the connected state when the reception signal level exceeds −79 dBm.

In the first example of the known CDMA/AMPS dual mode system portable telephone, as shown by the characteristic curve L1 of FIG. 7, the disturbance signal level exceeds the reference line in the IS-95 within a range in which the reception signal level ranges from −101 dBm to −79 dBm. However, as shown by the characteristic curve L1 of FIG. 6, the C/N is deteriorated considerably within a range in which the reception signal level ranges from −79 dBm to −60 dBm. On the other hand, in the second example of the known CDMA/AMPS dual mode system portable telephone, as shown by the characteristic curve L2 of FIG. 6, a relatively satisfactory C/N is presented within substantially the whole range of the reception signal level. However, as shown by the characteristic curve L2 of FIG. 7, within a range in which the reception signal level ranges from −95 dBm to −79 dBm, the disturbance signal level is under the reference line in the IS-95. Hence, it is very difficult to satisfy the reference line in the IS-95.

SUMMARY OF THE INVENTION

In view of the aforesaid aspect, it is an object of the present invention to provide a reception circuit having a performance in which a disturbance signal level exceeds a reference line in the IS-95 and a C/N (carrier-to-noise ratio) of the whole of the reception signal level is satisfactory.

In order to attain the above-mentioned object, in the reception circuit according to the present invention, a reception circuit includes at least a variable gain high-frequency amplifier, a reception signal bypass circuit selectively connected to the variable gain high-frequency amplifier in parallel and a control switching unit, wherein the control switching unit sets a first operation state in which the variable gain high-frequency amplifier is placed in an automatic gain amplified state and the reception bypass circuit is placed in a non-connected state when the reception signal level falls within the smallest first range and increases with the lapse of time, the control switching unit sets a second operation state in which the variable gain high-frequency amplifier is placed in a non-operable state and the reception signal bypass circuit is placed in the connected state when the reception signal level goes from the first range to a second range larger than the first range, and the control switching unit switches the variable gain high-frequency amplifier and the reception signal bypass circuit from the second operation state to the first operation state when the reception signal level decreases with the lapse of time and reaches an intermediate level from the second range to the first range.

According to the above-mentioned means, when the reception signal level falls within the smallest first range and increases with the lapse of time, the variable gain high-frequency amplifier executes the automatic gain control to cause the disturbance signal level to exceed the reference line in the IS-95. On the other hand, when the reception signal falls within the second range larger than the first range and decreases with the lapse of time, the reception signal bypass circuit is connected until the reception signal level reaches from the second range to the intermediate level within the first range and the automatic gain control is not executed by the variable gain high-frequency amplifier, thereby resulting in an excellent C/N ratio.

In a first aspect of the present invention, there is provided a reception circuit which is comprised of a variable gain high-frequency amplifier for amplifying a variable gain of at least a reception signal, a reception signal bypass circuit selectively connected to the high-frequency amplifier in parallel and a control switching unit for switching a gain state of the high-frequency amplifier and a connected state of the reception signal bypass circuit in response to the reception signal level, wherein the control switching unit sets a first operation state in which the high-frequency amplifier is placed in an automatic gain amplified state and the reception bypass circuit is placed in a non-connected state when the reception signal level falls within the smallest first range and increases with the lapse of time, the control switching unit sets a second operation state in which the high-frequency amplifier is placed in a non-operable state and the reception signal bypass circuit is placed in the connected state when the reception signal level goes from the first range to a second range larger than the first range, and the control switching unit switches the high-frequency amplifier and the reception signal bypass circuit from the second operation state to the first operation state when the reception signal level decreases with the lapse of time and reaches an intermediate level from the second range to the first range.

In a second aspect of the present invention, there is provided a reception circuit which comprises a high-frequency amplifier for amplifying a variable gain of at least a reception signal, an intermediate-frequency amplifier for amplifying a variable gain of an intermediate-frequency signal, a reception signal bypass circuit selectively connected to the high-frequency amplifier in parallel and a control switching unit for switching gain states of the high-frequency amplifier and the intermediate-frequency amplifier and a connected state of the reception signal bypass circuit in response to the reception signal level, wherein the control switching unit sets a first operation state in which the high-frequency amplifier is placed in an automatic gain amplified state, the reception bypass circuit is placed in a non-connected state and the intermediate-frequency amplifier is set in a constant gain amplified state when the reception signal level falls within the smallest first range and increases with the lapse of time, the control switching unit sets a second operation state in which the high-frequency amplifier is placed in a non-operable state, the reception signal bypass circuit is placed in the connected state and the intermediate-frequency amplifier is set in the automatic gain amplified state when the reception signal level goes from the first range to a second range larger than the first range and increases with the lapse of time, and the control switching unit switches the high-frequency amplifier, the reception signal bypass circuit and the intermediate-frequency amplifier from the second operation state to the first operation state when the reception signal level decreases with the lapse of time and reaches an intermediate level from the second range to the first range.

In a specific example of the embodiment of the invention, in the reception circuit, the first range of the reception signal level falls within a range of from −85 dBm to −79 dBm or less and an intermediate level of the first range falls within −88 dBm to −92 dBm.

In a preferred embodiment according to the present invention, in the reception circuit, the reception signal is a reception signal in a code-division-multiple-access system portable telephone.

According to the embodiment of the present invention, when the reception signal level falls within the first smallest range and increases with the lapse of time, the reception signal bypass circuit is placed in the non-connected state to allow the high-frequency amplifier to execute only the automatic gain control thereby obtaining the disturbance signal level greater than the reference line in the IS-95. When the reception signal level reaches the second range larger than the first range, the reception signal bypass circuit is connected to bypass the high-frequency amplifier. On the other hand, when the reception signal level decreases with the lapse of time from the second range, until the reception signal level reaches from the second range to the intermediate level within the first range, the reception signal bypass circuit is connected to bypass the high-frequency amplifier, whereby the C/N is set in the satisfactory state. When the reception signal level reaches the intermediate level within the first range, the reception signal bypass circuit is placed in the non-connected state to allow only the high-frequency amplifier to execute the automatic gain control. Thus, there can be obtained the reception circuit in which the disturbance signal greater than the reference line in the IS-95 can be achieved and the satisfactory C/N state may be achieved simultaneously.

DESCRIPTION OF THE PREFERRED EMBODIMENT

An embodiment according to the present invention will hereinafter be described with reference to the drawings.

Figure 1:
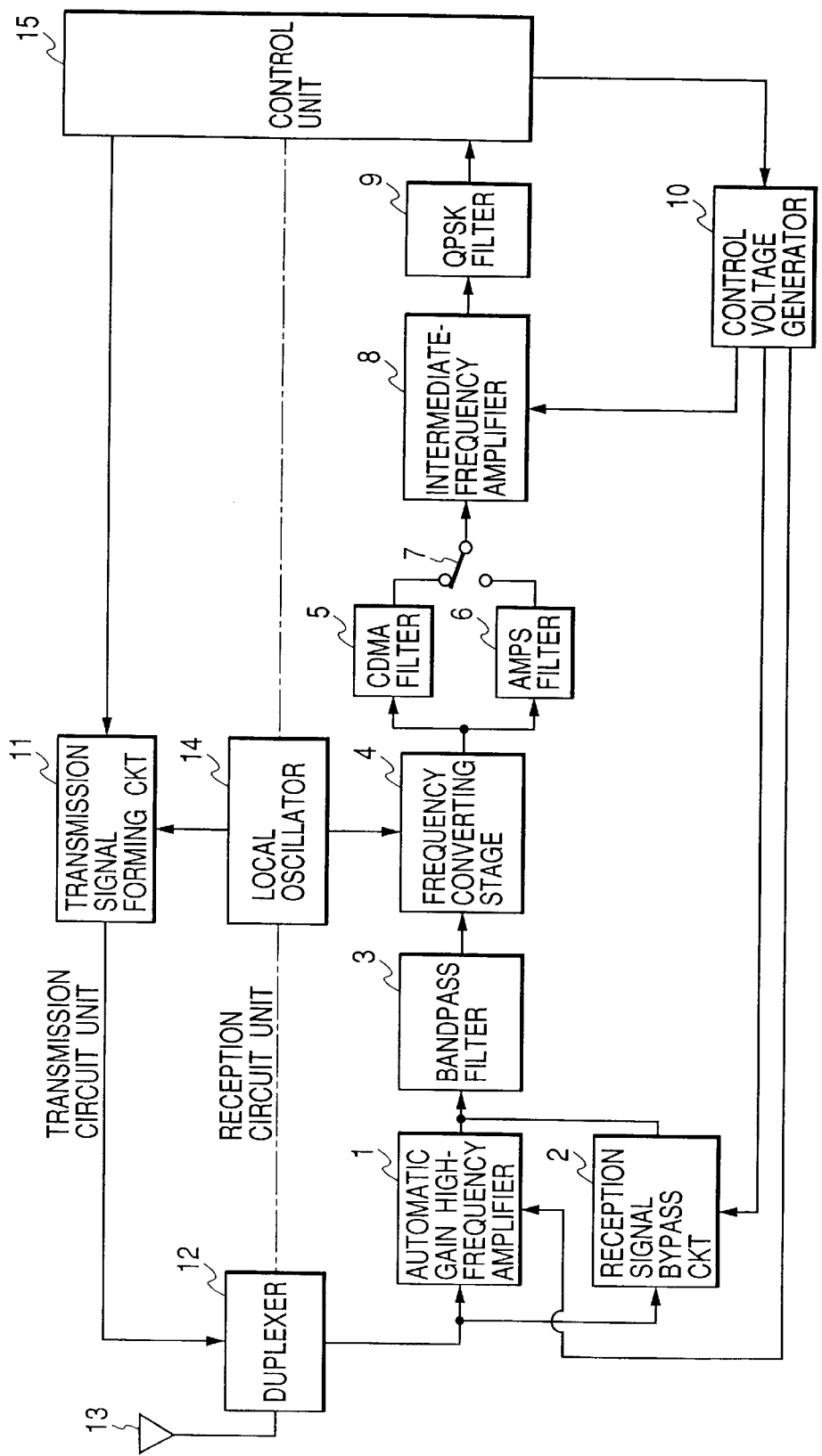
FIG. 1 is a block diagram showing a reception circuit according to an embodiment of the present invention.

FIG. 1 is a block diagram showing a reception circuit according to an embodiment of the present invention, and illustrates an example of a reception circuit of a CDMA/AMPS dual mode system portable telephone.

As shown in FIG. 1, in the portable telephone of he CDMA/AMPS dual mode system according to this embodiment, a reception circuit unit comprises an automatic gain low-noise high-frequency amplifier 1, a reception signal bypass circuit 2, a bandpass filter 3, a frequency converter 4, a CDMA filter 5, an AMPS filter 6, a change-over switch 7, an automatic gain intermediate-frequency amplifier 8, a QPSK demodulator 9 and a control voltage generating unit 10. A transmission circuit unit comprises a transmission signal forming circuit 11, and a transmission and reception common circuit unit comprises a duplexer 12, a transmission antenna 13, a local oscillator 14 and a control unit 15.

Then, in the reception circuit, the automatic gain low-noise high-frequency amplifier 1 has an input terminal connected to an output terminal of the duplexer 12 and an output terminal connected to an input terminal of the bandpass filter 3. The reception signal bypass circuit 2 has an input terminal connected to an input terminal of the automatic gain low-noise high-frequency amplifier 1 and an output terminal connected to an output terminal of the automatic gain low-noise high-frequency amplifier 1. The bandpass filter 3 has an output terminal connected to a first input terminal of the frequency converter 4. The frequency converter 4 has a second input terminal connected to an output terminal of the local oscillator 14 and an output terminal connected to respective input terminals of the CDMA filter 5 and an AMPS filter 6. The change-over switch 7 has two fixed contacts connected to respective output terminals of the CDMA filter 5 and the AMPS filter 6 and a movable contact connected to an input terminal of the automatic gain intermediate-frequency amplifier 8. The automatic gain intermediate-frequency amplifier 8 has an output terminal connected to an input terminal of the QPSK demodulator 9. The QPSK demodulator 9 has an output terminal connected to the control unit 15. The control voltage generating unit 10 has an input terminal connected to the control unit 15, a first output terminal connected to a control terminal of the automatic gain low-noise high-frequency amplifier 1, a second output terminal connected to a control terminal of the reception signal bypass circuit 2 and a third output terminal connected to an output terminal of the automatic gain intermediate-frequency amplifier 8. Also, in the transmission circuit unit, the transmission signal forming circuit 11 has an input terminal connected to the control unit 15, an output terminal connected to an input terminal of the duplexer 12 and a second input terminal connected to the local oscillator 14. Further, in the transmission and reception common circuit unit, the input and output terminal of the duplexer 12 is connected to the transmission and reception antenna 13.

Figure 2:
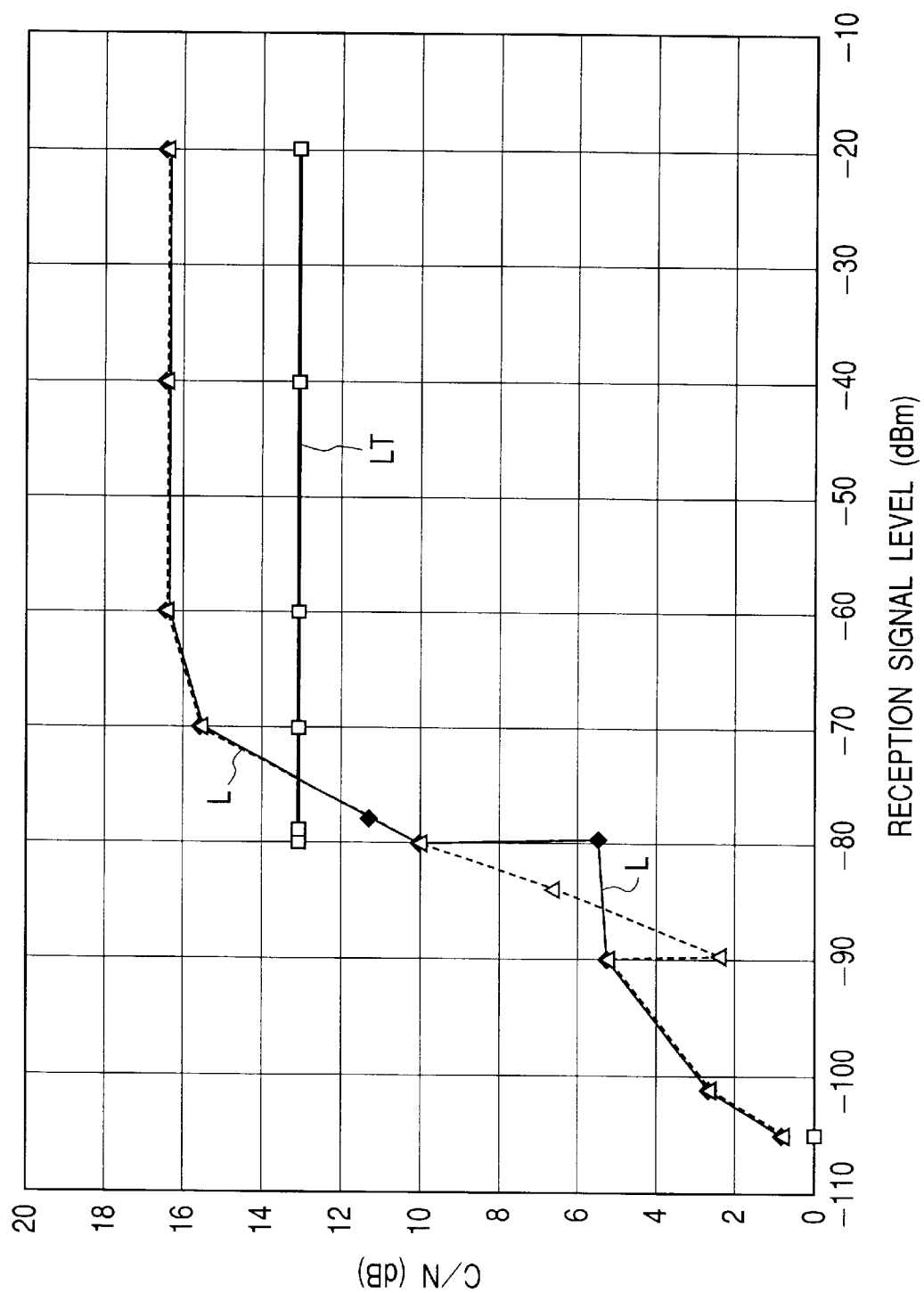
FIG. 2 is a characteristic graph showing a C/N relative to a reception signal level in the embodiment illustrated in FIG. 1.
Figure 3:
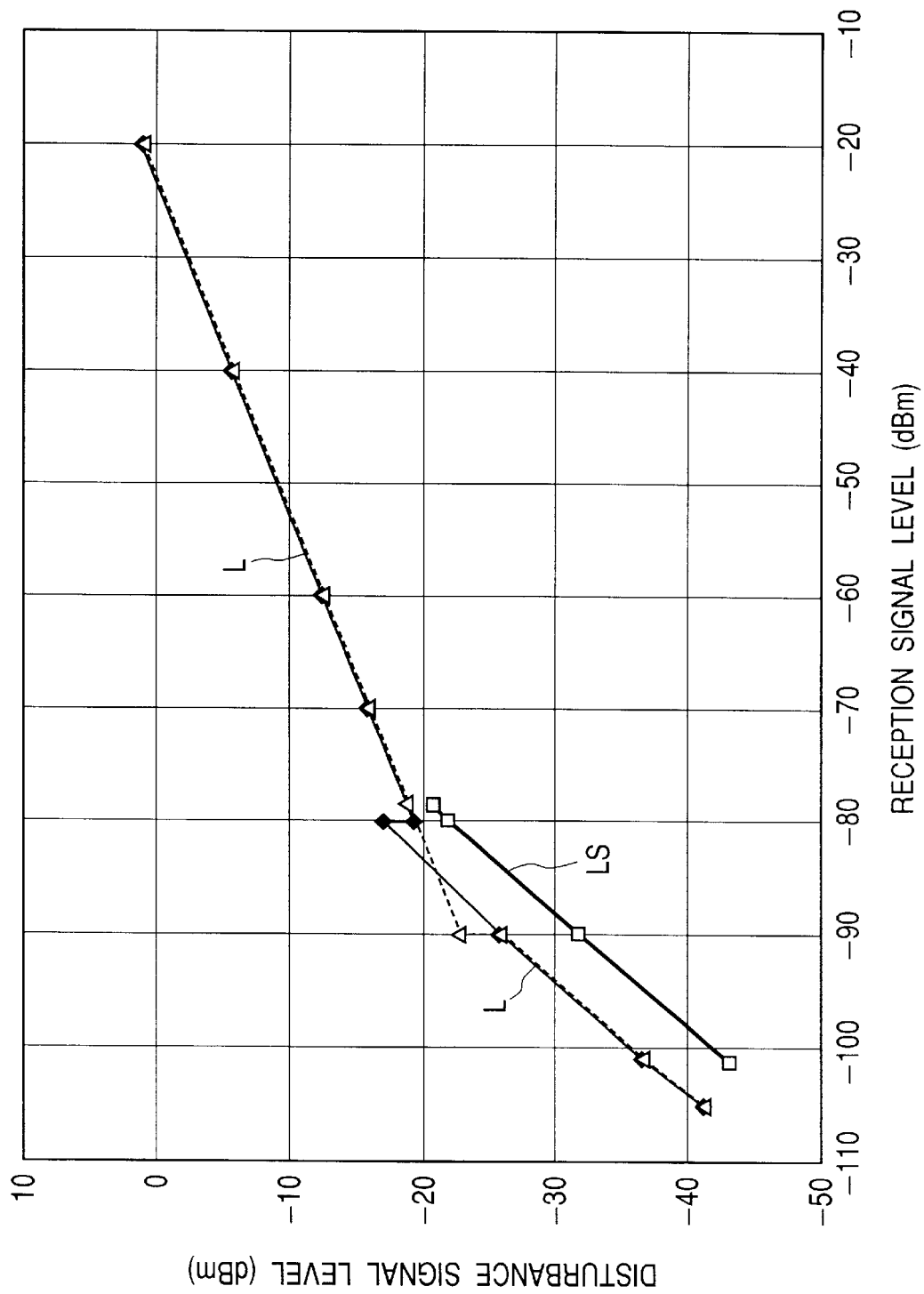
FIG. 3 is a characteristic graph showing a disturbance signal level relative to the reception signal level in the embodiment illustrated in FIG. 1.
Figure 4:
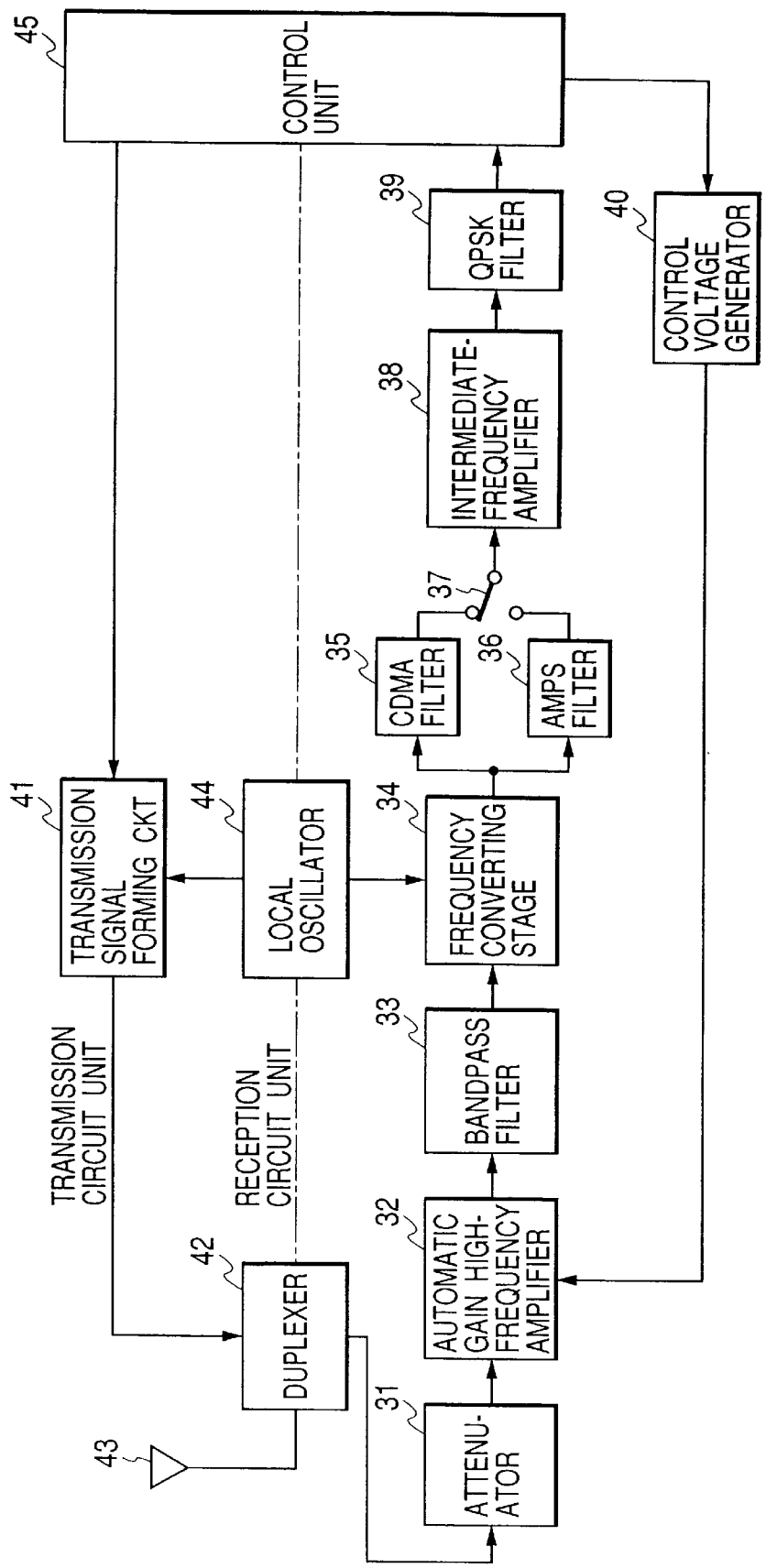
FIG. 4 is a block diagram showing an example of a known CDMA/AMPS dual mode system portable telephone.
Figure 5:
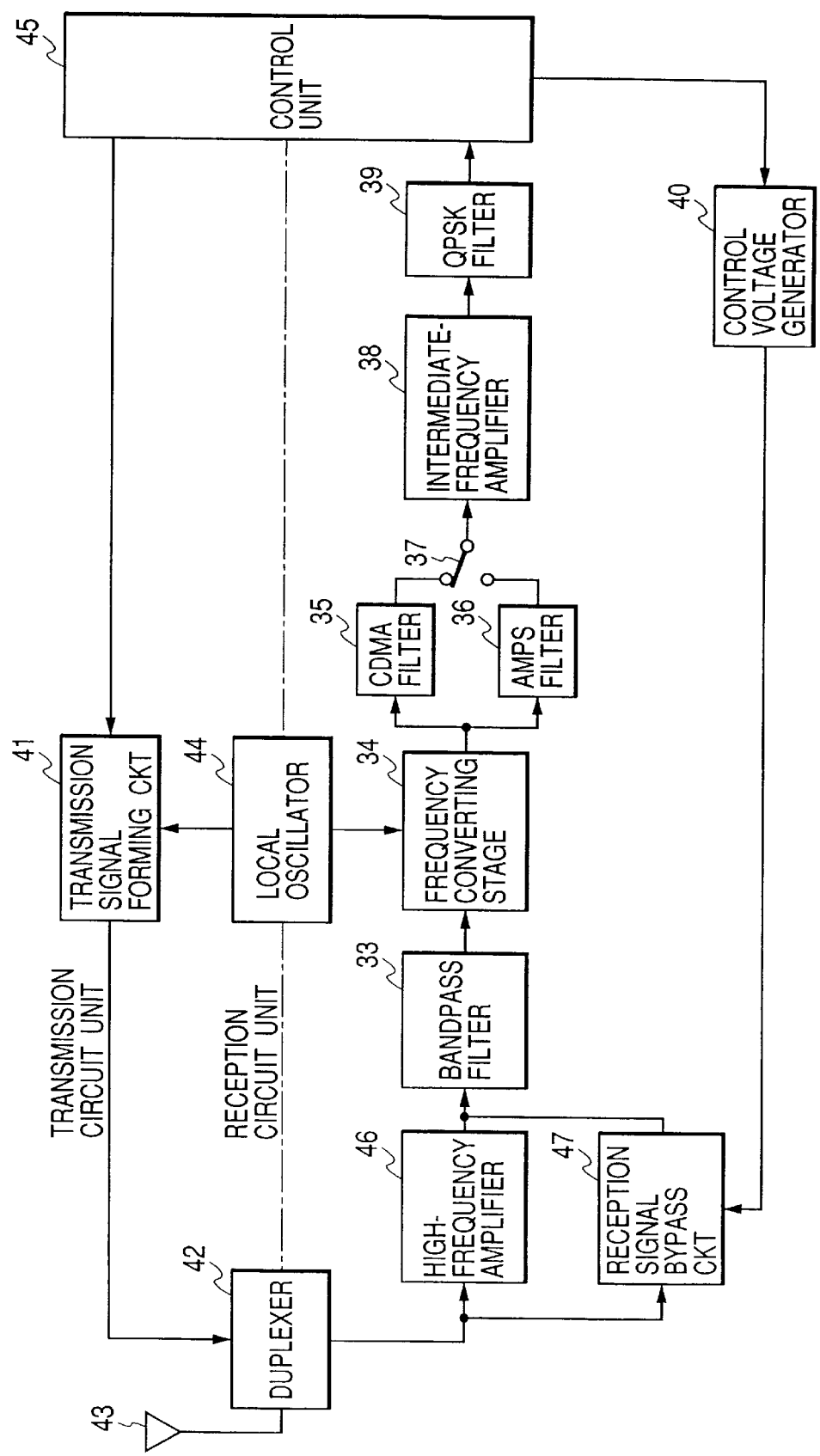
FIG. 5 is a block diagram showing another example of a known CDMA/AMPS dual mode system portable telephone;.
Figure 6:
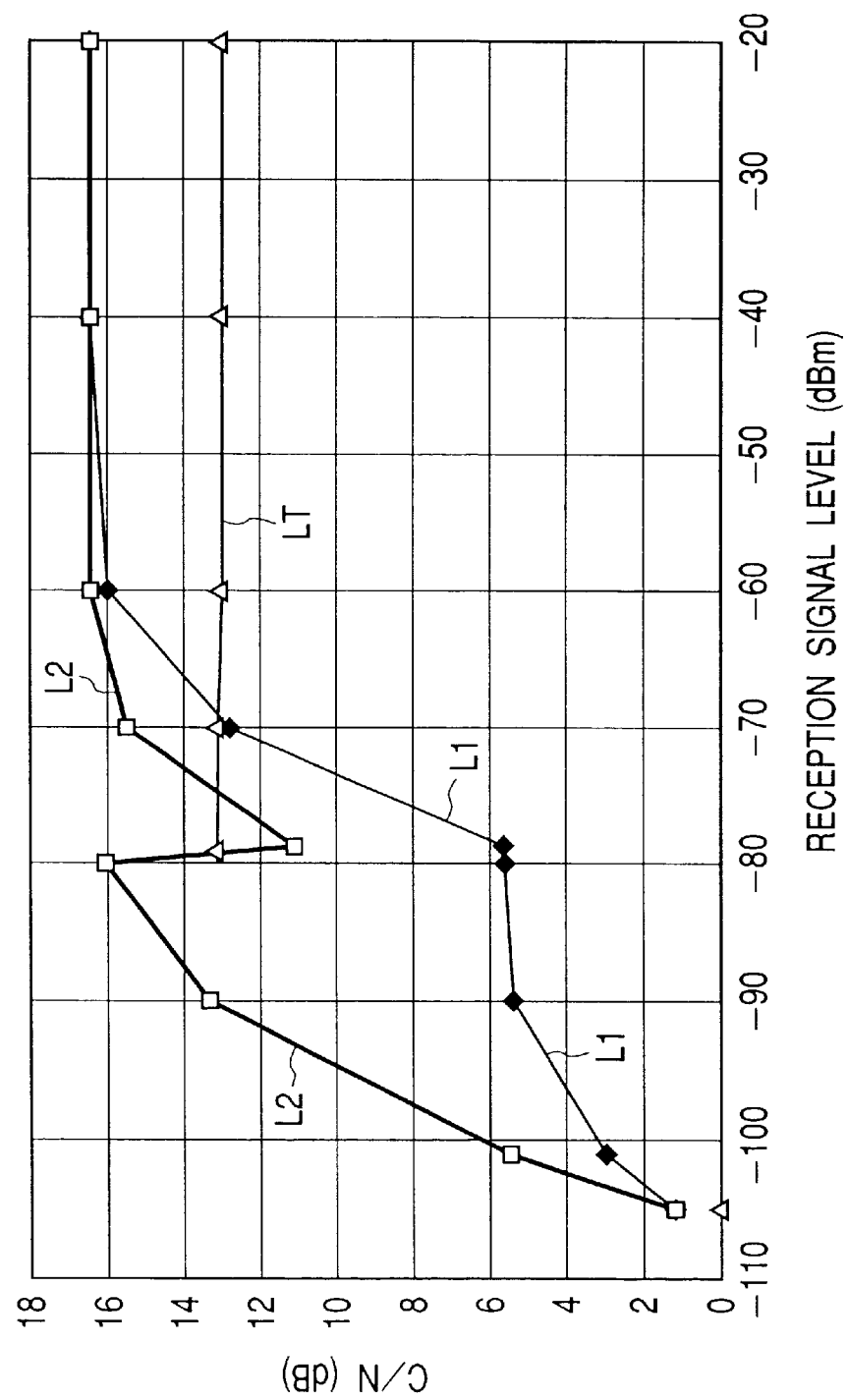
FIG. 6 is a characteristic graph showing a C/N relative to a reception signal level in a known CDMA/AMPS dual mode system portable telephone.
Figure 7:
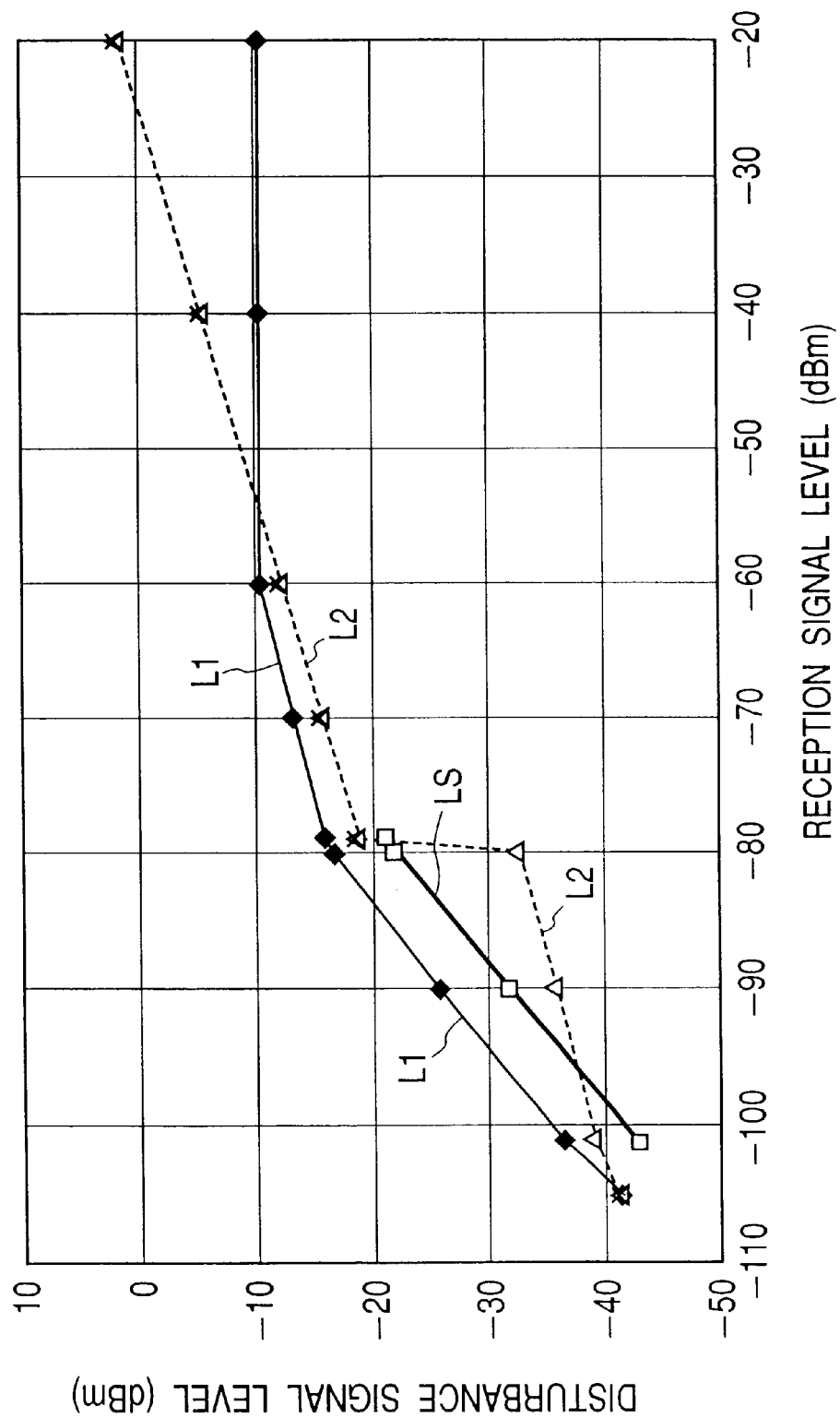
FIG. 7 is a characteristic graph showing a disturbance signal level relative to a reception signal level in a known CDMA/AMPS dual mode system portable telephone.

Also, FIG. 2 is a characteristic graph showing a C/N (carrier-to-noise ratio) relative to the reception signal level in the CDMA/AMPS dual mode system portable telephone according to this embodiment. FIG. 3 is a characteristic graph showing a disturbance signal level relative to the reception signal level in the CDMA/AMPS dual mode system portable telephone according to this embodiment.

In FIG. 2, a vertical axis shows a C/N expressed by dB, and a horizontal axis shows a reception signal level expressed by dBm. In FIG. 3, a vertical axis shows a disturbance signal level expressed by dBm, and a horizontal axis shows a reception signal level expressed by dBm.

A characteristic curve L in FIGS. 2 and 3 show characteristics according to this embodiment. A straight line LT in FIG. 2 shows a target line C/N, and a straight line in FIG. 3 shows a reference line in the IS-95.

Since the whole operation of the CDMA/AMPS dual mode system portable telephone thus arranged according to this embodiment is almost the same as that of the earlier-noted known CDMA/AMPS dual mode system portable telephone, the whole operation of the CDMA/AMPS dual mode system portable telephone according to this embodiment need not be described, and an operation of the portion which relates to the automatic gain low-noise high-frequency amplifier 1, the reception signal bypass circuit 2, the automatic gain intermediate-frequency amplifier 8 and the control voltage generating unit 10 will be described with reference to the characteristic graphs of FIGS. 2 and 3.

Initially, if the reception signal level supplied to the automatic gain low-noise high-frequency amplifier 1 is −101 dBm or less, then the reception signal bypass circuit 2 is placed in the non-connected state by a non-operation voltage supplied from the control voltage generating unit 10 and only the automatic gain low-noise high-frequency amplifier 1 is operated. At that time, while the reception signal level increases with the lapse of time and the reception signal level falls within a range (this range will be referred to as a first range) −79 dBm or less, the gain of the automatic gain low-noise high-frequency amplifier 1 is controlled by the automatic gain control voltage supplied from the control voltage generating unit 10 so that the C/N progressively increases as shown by the characteristic curve L shown in FIG. 2 and that the disturbance signal level linearly increases as shown by the characteristic curve L shown in FIG. 3. Incidentally, at that time point, by a constant voltage supplied from the control voltage generating unit 10, the automatic gain intermediate-frequency amplifier 8 is set in a constant gain.

Then, if the reception signal level supplied to the automatic gain low-noise high-frequency amplifier 1 exceeds −79 dBm, then the reception signal bypass circuit 2 is placed in the connected state by an operation voltage supplied from the control voltage generating unit 10, the automatic gain low-noise high-frequency amplifier 1 is placed in the non-operating state by the non-operating voltage supplied from the control voltage generating unit 10, and the automatic gain intermediate-frequency amplifier 8 is energized to execute the automatic gain operation by the automatic gain control voltage similarly supplied from the control voltage generating unit 10. As a result, if the reception signal level increases with the lapse of time within a range in which the reception signal level exceeds −79 dBm (this range will be referred to as a second range), then by the gain control of the automatic gain intermediate-frequency amplifier 8, the C/N rapidly increases as shown by the characteristic curve shown in FIG. 2 and progressively increases. The disturbance signal level linearly increases with a smaller inclination than previously as shown by the characteristic curve L shown in FIG. 3.

On the other hand, if the reception signal level decreases with the lapse of time within the second range, while the reception signal level remains within the second range, and until it goes over the second range and reaches −90 dBm within the first range, the connected state of the reception signal bypass circuit 2, the non-operation state of the automatic gain low-noise high-frequency amplifier 1 and the automatic gain operation state of the automatic gain intermediate-frequency amplifier 8 are maintained so that the C/N slightly rapidly decreases as shown by the characteristic curve L shown in FIG. 2 and that the disturbance signal level linearly decreases with a low inclination as shown by the characteristic curve shown L in FIG. 3. Then, if the reception signal level reaches −90 dBm within the first range, then the automatic gain low-noise high-frequency amplifier 1 resumes the automatic gain control operation by the automatic gain control voltage supplied from the control voltage generating unit 10, the reception signal bypass circuit 2 is placed in the non-connected state by the non-operation voltage supplied from the control voltage generating unit 10, and the automatic gain intermediate-frequency amplifier 8 is set to the constant gain by the constant voltage supplied from the control voltage generating unit 10, so that the C/N temporarily rapidly increases as shown by the characteristic curve L shown in FIG. 2 and then progressively decreases and the disturbance signal level temporarily rapidly decreases and then decreases with a larger inclination as shown by the characteristic curve L shown in FIG. 3.

According to the reception circuit of this embodiment, which is operated as described above, as shown by the characteristic curves L shown in FIGS. 2 and 3, it becomes possible to simultaneously achieve the a satisfactory C/N and the a disturbance signal level exceeding the reference line LS in the IS-95 at the same time.

While the gain of the automatic gain intermediate-frequency amplifier 8 is controlled in response to the reception level by using the automatic gain intermediate-frequency amplifier 8 as described above, the reception circuit of the present invention is not limited to the reception circuit using the automatic gain intermediate-frequency amplifier 8, and a satisfactory C/N state and the a disturbance signal level exceeding the reference line LS in the IS-95 may be achieved at the same time by a reception circuit using a fixed gain intermediate-frequency amplifier.

Also, while the automatic gain control operation of the automatic gain low-noise high-frequency amplifier 1 is switched (hereinafter this will be referred to as connection switching to bypass circuit) to the connection state of the reception signal bypass circuit 2 if the reception signal level reaches −79 dBm when the reception signal level increases with the lapse of time as described above, the connection switching to the bypass circuit according to the present invention is not limited to the case in which the reception signal level reaches −79 dBm and a case in which the reception signal level falls below −79 dBm, specifically in a level ranging from −85 dBm to −79 dBm, may be used. That is, it is sufficient that the connection switching to the bypass circuit according to the present invention has been completed when the reception signal level reaches 79 dBm. In practice, the connection switching to the bypass circuit is executed when the reception signal level reaches a level between −85 dBm and −79 dBm, before reaching −79 dBm. Accordingly, the range in which the reception signal level ranges from −85 dBm to −79 dBm corresponds to the first range of the reception signal level.

In the embodiment above, an example is described in which, when the reception signal level decreases with the lapse of time, within the first range of the reception signal level, the automatic gain low-noise high-frequency amplifier 1 resumes the automatic gain control operation so that the intermediate level of the reception signal for placing the reception signal bypass circuit 2 in the non-connection state becomes −90 dBm. However, the intermediate level of the reception signal level according to the present invention is not limited to −90 dBm, and any level may be used so long as it falls within a range from −88 dBm to −92 dBm.

As described above, according to the present invention, since the automatic gain control is executed by the variable gain high-frequency amplifier when the reception level falls within the smallest first range and increases with the lapse of time, the disturbance signal level may exceed the reference line in the IS-95. Further, since the reception signal bypass circuit is connected to inhibit the variable gain high-frequency amplifier from executing the automatic gain control until the reception signal level reaches the intermediate level from the second range to the first range when the reception signal level falls within the second range larger than the first range and decreases with the lapse of time, the effect that a C/N can be made satisfactory is realized.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A reception circuit comprising:
a high-frequency amplifier for amplifying a reception signal with a variable gain;
a reception signal bypass circuit selectively connected to said high-frequency amplifier in parallel; and
a control switching unit for switching a gain of said high-frequency amplifier and a connected state of said reception signal bypass circuit in response to a reception signal level, wherein said control switching unit sets a first operation state in which said high-frequency amplifier is placed in a gain controlled amplifying state and said reception bypass circuit is placed in a non-connected state when said reception signal level falls within a first range and increases with the lapse of time, said control switching unit sets a second operation state in which said high-frequency amplifier is placed in a non-operable state and said reception signal bypass circuit is placed in the connected state when said reception signal level goes from said first range to a second range, said second range being larger than said first range, and said control switching unit switches said high-frequency amplifier and said reception signal bypass circuit from said second operation state to said first operation state when said reception signal level decreases with the lapse of time from said second range to said first range and reaches an intermediate level within said first range.

2. A reception circuit as claimed in claim 1, wherein said first range of said reception signal level falls within a range of from −85 dBm to −79 dBm or less and an intermediate level of said first range falls within −88 dBm to −92 dBm.

3. A reception circuit as claimed in claim 1, wherein said reception signal is a reception signal in a code-division-multiple-access system portable telephone.

4. A reception circuit comprising:
a high-frequency amplifier for amplifying a reception signal with a variable gain;
an intermediate-frequency amplifier for amplifying an intermediate-frequency signal with a variable gain;
a reception signal bypass circuit selectively connected to said high-frequency amplifier in parallel; and
a control switching unit for switching gains of said high-frequency amplifier and said intermediate-frequency amplifier and a connected state of said reception signal bypass circuit in response to a reception signal level, wherein said control switching unit sets a first operation state in which said high-frequency amplifier is placed in a gain controlled amplifying state, said reception signal bypass circuit is placed in a non-connected state and said intermediate-frequency amplifier is placed in a gain controlled amplifying state when said reception signal level falls within a first range and increases with the lapse of time, said control switching unit sets a second operation state in which said high-frequency amplifier is placed in a non-operable state, said reception signal bypass circuit is placed in the connected state and said intermediate-frequency amplifier is placed in a gain controlled amplifying state when said reception signal level goes from said first range to a second range, said second range being larger than said first range, and increases with the lapse of time, and said control switching unit switches said high-frequency amplifier, said reception signal bypass circuit and said intermediate-frequency amplifier from said second operation state to said first operation state when said reception signal level decreases with the lapse of time from said second range to said first range and reaches an intermediate level within said first range.

5. A reception circuit as claimed in claim 4, wherein said first range of said reception signal level falls within a range of from −85 dBm to −79 dBm or less and an intermediate level of said first range falls within −88 dBm to −92 dBm.

6. A reception circuit as claimed in claim 4, wherein said reception signal is a reception signal in a code-division-multiple-access system portable telephone.

7. A portable telephone incorporating the reception circuit according to claim 1.

8. A portable telephone incorporating the reception circuit according to claim 4.

* * * * *